United States Patent
Pan et al.

(10) Patent No.: US 11,361,753 B2
(45) Date of Patent: Jun. 14, 2022

(54) SYSTEM AND METHOD FOR CROSS-SPEAKER STYLE TRANSFER IN TEXT-TO-SPEECH AND TRAINING DATA GENERATION

(71) Applicant: MICROSOFT TECHNOLOGY LICENSING, LLC, Redmond, WA (US)

(72) Inventors: Shifeng Pan, Beijing (CN); Lei He, Beijing (CN); Yulin Li, Beijing (CN); Sheng Zhao, Beijing (CN); Chunling Ma, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/030,871

(22) Filed: Sep. 24, 2020

(65) Prior Publication Data
US 2022/0068259 A1     Mar. 3, 2022

(30) Foreign Application Priority Data

Aug. 28, 2020   (CN) .......................... 202010885556.9

(51) Int. Cl.
| | | |
|---|---|---|
| *G10L 13/10* | (2013.01) | |
| *G10L 15/06* | (2013.01) | |
| *G10L 21/013* | (2013.01) | |
| *G10L 25/18* | (2013.01) | |
| *G10L 25/63* | (2013.01) | |
| *G10L 15/18* | (2013.01) | |
| *G10L 25/30* | (2013.01) | |
| *G10L 15/187* | (2013.01) | |

(52) U.S. Cl.
CPC ............ *G10L 15/063* (2013.01); *G10L 13/10* (2013.01); *G10L 15/187* (2013.01); *G10L 15/1807* (2013.01); *G10L 25/18* (2013.01); *G10L 25/30* (2013.01); *G10L 25/63* (2013.01); *G10L 2021/0135* (2013.01)

(58) Field of Classification Search
CPC ................... G10L 13/10; G10L 15/063; G10L 2021/0135
See application file for complete search history.

(56) References Cited

U.S. PATENT DOCUMENTS

| | | |
|---|---|---|
| 7,124,082 B2 | 10/2006 | Freedman |
| 7,979,280 B2 | 7/2011 | Wouters et al. |
| 8,744,854 B1 | 6/2014 | Chen |
| 9,754,580 B2 | 9/2017 | Weissberg et al. |

(Continued)

OTHER PUBLICATIONS

Sisman, B. (2019). Machine learning for limited data voice conversion (Doctoral dissertation, Ph. D. thesis).*

(Continued)

*Primary Examiner* — Bryan S Blankenagel
(74) *Attorney, Agent, or Firm* — Workman Nydegger

(57) ABSTRACT

Systems are configured for generating spectrogram data characterized by a voice timbre of a target speaker and a prosody style of source speaker by converting a waveform of source speaker data to phonetic posterior gram (PPG) data, extracting additional prosody features from the source speaker data, and generating a spectrogram based on the PPG data and the extracted prosody features. The systems are configured to utilize/train a machine learning model for generating spectrogram data and for training a neural text-to-speech model with the generated spectrogram data.

20 Claims, 12 Drawing Sheets

(56) References Cited

U.S. PATENT DOCUMENTS

| | | | |
|---|---|---|---|
| 10,176,819 B2 | 1/2019 | Sun et al. | |
| 10,559,299 B1* | 2/2020 | Arel | G10L 15/02 |
| 10,614,826 B2* | 4/2020 | Huffman | G10L 15/22 |
| 2020/0051583 A1* | 2/2020 | Wu | G10L 13/08 |

OTHER PUBLICATIONS

Akuzawa, et al., "Expressive Speech Synthesis via Modeling Expressions with Variational Autoencoder", https://arxiv.org/abs/1804.02135, Feb. 11, 2019, 5 Pages.

Bowman, et al., "Generating Sentences from a Continuous Space", In Proceedings of the 20th SIGNLL Conference on Computational Natural Language Learning, May 12, 2016, 12 Pages.

Burgess, et al., "Understanding disentangling in β-VAE", In Repository of arXiv preprint arXiv:1804.03599, Apr. 10, 2018, 11 Pages.

Chorowski, et al., "Attention-Based Models for Speech Recognition", In Proceedings of Advances in Neural Information Processing Systems, vol. 28, Dec. 7, 2015, 9 Pages.

Doersch, Carl, "Tutorial on variational autoencoders", https://arxiv.org/pdf/1606.05908.pdf, Aug. 13, 2016, 23 Pages.

Goodfellow, Ianj., "Generative adversarial Nets", In Proceedings of the 27th International Conference on Neural Information Processing Systems, vol. 2, Dec. 1, 2014, 9 Pages.

Higgins, et al., "β-VAE: Learning Basic Visual Concepts With a Constrained Variational Framework", Retrieved From: https://openreview.net/references/pdf?id=Sy2fzU9gl, Nov. 4, 2016, 13 Pages.

Hochreiter, et al., "Long Short-Term Memory", In Journal of Neural Computation, vol. 9, Issue 8, Nov. 15, 1997, pp. 1735-1780.

Hsu, et al., "Learning Latent Representations for Speech Generation and Transformation", https://arxiv.org/abs/1704.04222, Sep. 22, 2017, 5 Pages.

Jia, et al., "Transfer Learning from Speaker Verification to Multispeaker Text-To-Speech Synthesis", In Proceedings of 32nd Conference on Neural Information Processing Systems, Dec. 3, 2018, 11 Pages.

Kingma, et al., "Auto-Encoding Variational Bayes", In Repository of arXiv:1312.6114v1, Dec. 20, 2013, 14 Pages.

Klimkov, et al., "Fine-grained robust prosody Transfer for Single-Speaker Neural Text-to-Speech", In Journal of Computing Research Repository, Jul. 2019, 5 Pages.

Krueger, et al., "Zoneout: Regularizing Mns by Randomly Preserving Hidden Activations", https://arxiv.org/pdf/1606.01305.pdf, Sep. 22, 2017, 11 Pages.

Levy-Leshem, et al., "Taco-VC: A Single Speaker Tacotron based Voice Conversion with Limited Data", In Journal of Computing Research Repository, Apr. 2019, 5 Pages.

Li, et al., "Close to Human Quality TTS with Transfomer", https://www.groundai.com/project/close-to-human-quality-tts-with-transformer/1, Sep. 19, 2018, 13 Pages.

Li, et al., "Improving Accent Conversion with Reference Encoder and End-To-EndText-To-Speech", In Journal of Computing Research Repository, May 19, 2020, 5 Pages.

Liu, et al., "Jointly Trained Conversion Model and WaveNet Vocoder for Non-parallel Voice Conversion using Mel-spectrograms and Phonetic Posteriorgrams", In Proceedings of 20th Annual Conference of the International Speech Communication Association, Sep. 15, 2019, 5 Pages.

Oord, et al., "Wavenet: A Generative Model for Raw Audio", Published in arXiv preprint, arXiv:1609.03499, Sep. 12, 2016, 15 Pages.

Ping, et al., "Deep Voice 3: Scaling Text-to-Speech with Convolutional Sequence Learning", In Journal of arXiv:1710.07654, Feb. 22, 2018, 16 Pages.

Schuster, et al., "Bidirectional recurrent neural networks", In the Journal of IEEE Transactions on Signal Processing, vol. 45, Issue 11, IEEE Transactions on Signal Processing, vol. 45, Issue 11, Nov. 11, 1997, pp. 2673-2681.

Shen, et al., "Natural TTS Synthesis by Conditioning Wavenet on MEL Spectrogram Predictions", In Proceedings of International Conference on Acoustics, Speech and Signal Processing, Apr. 15, 2018, pp. 4779-4783.

Skerry-Ryan, et al., "Towards End-to-End Prosody Transfer for Expressive Speech Synthesis with Tacotron", In the proceedings of 35th International Conference on Machine Learning, Mar. 2018, 10 Pages.

Stanton, et al., "Predicting Expressive Speaking Style from Text in End-to-End Speech Synthesis", https://arxiv.org/abs/1808.01410, Aug. 4, 2018, 8 Pages.

Vainio, Martti, "Artificial Neural Network Based Prosody Models for Finnish Text-to-Speech Synthesis", In Thesis of University of Helsinki, 2001, 130 Pages.

Wang, et al., "Style Tokens: Unsupervised Style Modeling, Control and Transfer in End-to-End Speech Synthesis", In the proceedings of 35th International Conference on Machine Learning , Mar. 23, 2018, 10 Pages.

Wu, et al., "VQVC+: One-Shot Voice Conversion by Vector Quantization and U-Net architecture", In Journal of Computing Research Repository, Jun. 7, 2020, 5 Pages.

Zhang, et al., "Learning Latent Representations for Style Control and Transfer in End-to-End Speech Synthesis", In Journal of Computing Research Repository, Dec. 11, 2018, 5 Pages.

Zhao, et al., "Foreign Accent Conversion by Synthesizing Speech from Phonetic Posteriorgrams", In Proceedings of 20th Annual Conference of the International Speech Communication Association, Sep. 15, 2019, 5 Pages.

Lian, et al., "Towards Fine-Grained Prosody Control for Voice Conversion", In Repository of arXiv:1910.11269v1, Oct. 24, 2019, 5 Pages.

"International Search Report and Written Opinion Issued in PCT Application No. PCT/US21/034671", dated Sep. 22, 2021, 10 Pages.

Liu, et al., "Multi-Target Emotional Voice Conversion with Neural Vocoders", In Repository of arXiv:2004.03782v1, Apr. 8, 2020, 7 Pages.

* cited by examiner

SYSTEM AND METHOD FOR CROSS-SPEAKER STYLE TRANSFER IN TEXT-TO-SPEECH AND TRAINING DATA GENERATION

CROSS-REFERENCE TO RELATED APPLICATIONS

This application claims the benefit of and priority to Chinese Application Serial No. 202010885556.9 filed on Aug. 28, 2020 and entitled "SYSTEM AND METHOD FOR CROSS-SPEAKER STYLE TRANSFER IN TEXT-TO-SPEECH AND TRAINING DATA GENERATION," which application is expressly incorporated herein by reference in its entirety.

BACKGROUND

Background and Relevant Art

A text-to-speech (TTS) model is one that is configured to convert arbitrary text into human-sounding speech data. A TTS model, sometimes referred to as a voice font, usually consists of a front end module, an acoustic model and a vocoder. The front end module is configured to do text normalization (e.g., convert a unit symbol into readable words) and typically converts the text into a corresponding phoneme sequence. The acoustic model is configured to convert input text (or the converted phonemes) to a spectrum sequence, while the vocoder is configured to convert the spectrum sequence into speech waveform data. Furthermore, the acoustic model decides how the text will be uttered (e.g., in what prosody, timbre, etc.).

Prosody typically refers to the patterns of rhythm and sound or the patterns or stress and/or intonation in a language. For example, in linguistics, prosody deals with properties of syllables and larger units of speech (i.e., larger than individual phonetic segments). Prosody is often characterized by variations in loudness of speech, pauses, and variations in rhythm (e.g., speaking rate). Speakers can also express prosody by varying the pitch (i.e., the quality of sound determined by the rate of vibrations producing it or in other words, the degree of highness or lowness of tone). In some instances, pitch refers to the fundamental frequency associated with a particular segment of speech. Prosody is also expressed by varying the energy of the speech. Energy typically refers to energy of the speech signal (i.e., the power fluctuations of the speech signal). Energy, in some instances, is based on a volume or amplitude of the speech signal.

In music, timbre (i.e., tone quality) typically refers to the character or quality of a musical sound or voice, the character associated with timbre being distinct from its pitch and intensity. Timbre is what allows a human ear to distinguish from a violin and a flute (or even more nuanced, a viola). In the same manner, a human ear can distinguish between different voices having different timbres.

A source acoustic model is configured as a multi-speaker model trained on multi-speaker data. In some cases, the source acoustic model is further refined or adapted using target speaker data. Typically, the acoustic model is speaker dependent, meaning that either it is directly trained on speaker data from a particular target speaker, or by refining a source acoustic model using speaker data from a particular target speaker.

The model, if well trained, can convert any text into speech that closely mimics how the target speaker speaks, i.e., in same voice timbre and similar prosody. Training data for TTS models usually comprises audio data obtained by recording the particular target speaker while they speak and a set of text corresponding to the audio data (i.e., the textual representation of what the target speaker is saying to produce the audio data).

In some instances, the text used for training a TTS model is generated by a speech recognition model and/or natural language understanding model which is specifically configured to recognize and interpret speech and provide the textual representation of the words that are recognized in the audio data. In other instances, the speaker is given a predetermined script from which read aloud, wherein the predetermined script and the corresponding audio data is used to train the TTS model.

It is noted that a target speaker is capable of producing speech in a variety of manners and styles. For example, an individual person may speak rapidly if they are excited or stutter if they are nervous. Additionally, a person may speak differently if they are conversing with a friend versus reciting a presentation to an audience.

If a user wants the voice font of a trained model to be capable to speak in a particular style or a particular emotional inflection, such as happily, or sadly, in a newscaster style, in a presenter style, in a story-telling style, etc., it is necessary to train the model with training data having that corresponding target style. For instance, first the recording of target speaker in target style must be collected and then the user can build the corresponding voice font using the training data in that style.

Initially, thousands of hours are required to build a source acoustic model. Then, vast amounts of training data are required to properly train the TTS model on one particular style. In some instances, the training/refining of the source acoustic model for a particular style may require hundreds, sometimes thousands, of sentences of speech training data. Thus, to properly train the TTS model(s) for a plurality of different styles, a proportional amount of training data must be collected for each of the different target speaker styles. This is an extremely time-consuming and costly process to record and analyze data in each of the desired styles. Furthermore, in some instances, the target speaker is not capable of or not well-suited to producing speech in the desired target style, which further exacerbates the difficulty in training the acoustic model. This is a significant barrier for a fast and efficient training of TTS models with voice fonts in the different target speaking style(s).

In view of the foregoing, there is an ongoing need for improved systems and methods for generating training data and training models for TTS models to produce speech data in a plurality of speaking styles for one or more target speakers.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed towards embodiments for cross-speaker style transfer in text-to-speech and for training data generation. In some instances, the disclosed embodiments include generating and utilizing spectrogram data for a target speaker in a particular prosody style. The spectrogram data is used, in some instances, to train a machine learning model for text-to-speech (TTS) conversion.

Some embodiments include methods and systems for receiving electronic content comprising source speaker data from a source speaker. In these embodiments, a computing system converts a waveform of the source speaker data to phonetic posterior gram (PPG) data by aligning the waveform of the source speaker data to the PPG data, wherein the PPG data define one or more features corresponding to the prosody style of the source speaker data.

In addition to the one or more features defined by the PPG data, one or more additional prosody features are extracted from the source speaker data. The computing system then generates a spectrogram based on (i) the PPG data, (ii) the extracted one or more additional prosody features and (iii) a voice timbre of the target speaker. Using this technique, the generated spectrogram is characterized by the prosody style of the source speaker and the voice timbre of the target speaker.

In some instances, the disclosed embodiments are directed towards embodiments for training a voice conversion machine learning model to generate cross-speaker style transfer spectrogram data. Additionally, some embodiments are directed to systems and methods for training a neural TTS model on training data generated by spectrogram data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some of the disclosed embodiments are include generating spectrogram data having a particular voice timbre of a first speaker (e.g., target speaker) and a particular prosody style transferred from a second speaker (e.g., a source speaker).

For example, in some embodiments, a computing system receives electronic content comprising source speaker data obtain from the source speaker. The waveform of the source speaker data is converted to phonetic data (e.g., phonetic posterior grams, PPGs). The PPG data is aligned to the waveform speaker data and defines one or more features corresponding to the prosody style of the source speaker. In addition to the one or more features defined by the PPG data, the computing system also extracts one or more additional prosody features from the source speaker data. Then, based on (i) the PPG data, (ii) the additionally extracted prosody features, and (iii) the voice timbre of the target speaker, the computing system generates a spectrogram having the voice timbre of the target speaker and the prosody style of the source speaker.

There are many technical benefits associated with the disclosed embodiments. For example, because the spectrogram data is able to be generated based on a dataset obtained from the target speaker and a dataset obtained from the source speaker, the spectrogram data is able to be generated at a more efficient rate. In addition, the spectrogram data is able to be generated based on any one of a prosody style obtained from a plurality of source speakers. In this manner, the spectrogram data is able to take on the voice timbre of a target speaker and any prosody style defined by a source speaker data set. In some embodiments, the voice timbre is configured as a speaker vector that accounts for the voice timbre of a particular speaker (e.g., the target speaker). This is a highly versatile method and decreases the both the computational time required for data generation as well as decreases the time and cost of the initial speaker data collection.

Technical benefits of the disclosed embodiments also include the training of a neural TTS model and the generation of speech output from text-based input using the neural TTS model. For example, because of the methods disclosed to generate the spectrogram data, the large datasets preferred for properly training the TTS model are able to be obtained in a faster method as compared to conventional methods.

Additional benefits and functionality of the disclosed embodiments will be described below, including the training of a voice conversion model and methods for a aligning the PPG data (and other prosody feature data) to the source speaker data at a frame-based granularity.

Figure 1:
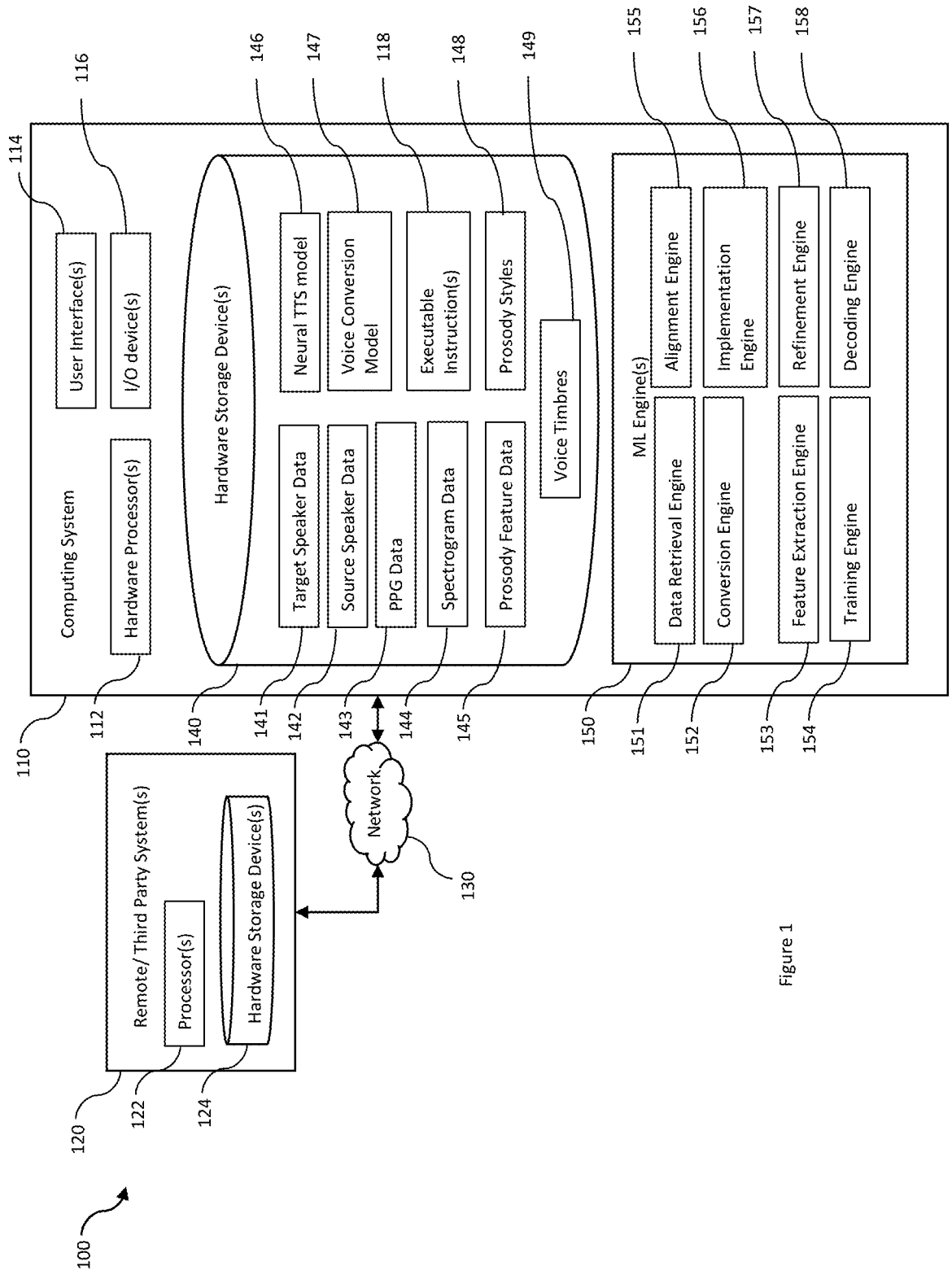
FIG. 1 illustrates a computing environment in which a computing system incorporates and/or is utilized to perform disclosed aspects of the disclosed embodiments. The illustrated computing system is configured for voice conversion and includes hardware storage device(s) and a plurality of machine learning engines. The computing system is in communication with remote/third party system(s).

Attention will now be directed to FIG. 1, which illustrates components of a computing system 110 which may include and/or be used to implement aspects of the disclosed invention. As shown, the computing system includes a plurality of machine learning (ML) engines, models, and data types associated with inputs and outputs of the machine learning engines and models.

Attention will be first directed to FIG. 1, which illustrates the computing system 110 as part of a computing environment 100 that also includes remote/third party system(s) 120 in communication (via a network 130) with the computing system 110. The computing system 110 is configured to train a plurality of machine learning models for speech recognition, natural language understanding, text-to-speech, and more particularly, cross-speaker style transfer applications. The computing system 110 is also configured to generate training data configured for training machine learning models to generate speech data for a target speaker characterized by the timbre of the target speaker and a prosody style of a particular source speaker. Additionally, or alternatively, the computing system is configured to operate a trained machine learning model for text-to-speech generation.

The computing system 110, for example, includes one or more processor(s) 112 (such as one or more hardware processor(s)) and a storage 140 (i.e., hardware storage device(s)) storing computer-executable instructions 118 wherein the storage 140 is able to house any number of data types and any number of computer-executable instructions 118 by which the computing system 110 is configured to implement one or more aspects of the disclosed embodiments when the computer-executable instructions 118 are executed by the one or more processor(s) 112. The computing system 110 is also shown including user interface(s) and input/output (I/O) device(s) 116.

The storage 140 is shown as a single storage unit. However, it will be appreciated that the storage 140 is, in some embodiments, a distributed storage that is distributed to several separate and sometimes remote/third party systems 120. The system 110 can also comprise a distributed system, in some embodiments, with one or more of the system 110 components being maintained/run by different discrete systems that are remote from each other and that each perform different tasks. In some instances, a plurality of distributed systems performs similar and/or shared tasks for implementing the disclosed functionality, such as in a distributed cloud environment.

In some embodiments, storage 140 is configured to store one or more of the following: target speaker data 141, source speaker data 142, PPG data 143, spectrogram data 144, prosody feature data 145, a neural TTS model 146, a voice conversion model 147, executable instruction(s) 118 or prosody styles 148.

In some instances, the storage 140 includes computer-executable instructions 118 for instantiating or executing one or more of the models and/or engines shown in computing system 110. In some instances, the one or more models are configured as machine learning models or machine learned models. In some instances, the one or more models are configured as deep learning models and/or algorithms. In some instances, the one or more models are configured as engines or processing systems (e.g., computing systems integrated within computing system 110), wherein each engine (i.e., model) comprises one or more processors (e.g., hardware processor(s) 112) and corresponding computer-executable instructions 118.

In some embodiments, target speaker data 141 comprises electronic content/data obtained from a target speaker, and the source speaker data 142 comprises electronic content/data from a source speaker. In some instances, the target speaker data 141 and/or source speaker data 142 comprise(s) audio data, text data and/or visual data. Additionally, or alternatively, in some embodiments, the target speaker data 141 and/or source speaker data 142 comprise metadata (i.e., attributes, information, speaker identifiers, etc.) corresponding to the particular speaker from which the data is collected. In some embodiments, the metadata comprises attributes associated with the identity of the speaker, characteristics of the speaker and/or the speaker's voice and/or information about where, when and/or how the speaker data is obtained.

In some embodiments, the target speaker data 141 and/or the source speaker data 142 is raw data (e.g., direct recordings). Additionally, or alternatively, in some embodiments, the target speaker data 141 and/or source speaker data 142 comprise processed data (e.g., waveform format of the speaker data and/or PPG data (e.g., PPG data 143) corresponding to the target and/or source speaker).

In some embodiments, the PPG data 143 comprises phonetic information about the speech data from a particular speaker (e.g., a source speaker and/or a target speaker). In some instances, the phonetic information is obtained at a determined granularity, for example, at a frame-based granularity. In other words, a phonetic posterior gram is generated for each frame such that the speech duration information of the source speaker (i.e., source prosody style) is precisely maintained during voice conversion and style transfer.

In some embodiments, the frame length for each piece of phonetic information comprises whole phrases of speech, whole words of speech, particular phonemes of speech and/or a pre-determined time duration. In some examples, the frame comprises a time duration selected between 1 millisecond to 10 seconds, or more preferably between 1 millisecond to 1 second, or even more preferably between 1 millisecond to 50 milliseconds, or yet even more preferably, a duration of approximately 12.5 milliseconds.

In some embodiments, the PPG data 143 is generated by a voice conversion model, or a component of a voice conversion model (e.g., MFCC-PPG model), wherein phonetic information is extracted from the source speaker data (e.g., a waveform of the source speaker data). In some embodiments, the PPG data 143 is input into a voice conversion model, more specifically into a PPG-Mel model which is configured to generate spectrogram data (e.g., spectrogram data 144).

The generated spectrogram data will have the same content as the source data, while maintaining the integrity of the timing alignment between the PPG data 143 and the spectrogram data 144. Thus, in some instances, the PPG data 143 comprises one or more prosody features (i.e., prosody attributes), wherein the one or more prosody attributes comprise duration information (e.g., speech duration, timing information, and/or speaking rate).

In some embodiments, the prosody attributes extracted from the PPG data are included in the prosody feature data 145. Additionally, or alternatively, the prosody feature data 145 comprises additional prosody features or prosody attributes. For example, in some instances, the additional prosody features comprise attributes corresponding to the pitch and/or energy contours of the speech waveform data.

In some embodiments, the spectrogram data 144 comprises a plurality of spectrograms. Typically, spectrograms are a visual representation of the spectrum of frequencies of a signal as it varies with time (e.g., the spectrum of frequencies that make up the speaker data). In some instances, spectrograms are sometimes called sonographs, voiceprints or voicegrams. In some embodiments, the spectrograms included in the spectrogram data 144 are characterized by the voice timbre and prosody style of a target speaker. Additionally, or alternatively, the spectrograms included in the spectrogram data 144 are characterized by the voice timbre of the target speaker and the prosody style of the source speaker.

In some embodiments, the spectrograms are converted to the mel-scale. The mel-scale is a non-linear scale of pitches determined by listeners to be equidistant from each-other, and more closely mimics human response/human recognition of sound versus a linear scale of frequencies. In such embodiments, the spectrogram data comprises the mel-frequency cepstrum (MFC) (i.e., the representation of the short-term power spectrum of a sound, based on the linear cosine transformation of a log power spectrum on a nonlinear mel scale of frequency. Thus, mel-frequency cepstral coefficients (MFCCs) are the coefficients that comprise an MFC. For example, the frequency bands are equally spaced on the mel scale for an MFC.

In some embodiments, the hardware storage device 140 stores the neural TTS model 146, which is configured as a neural network that is trainable or is trained to convert input text to speech data. For example, a portion of an email containing one or more sentences (e.g., a particular number of machine-recognizable words) is applied to the neural TTS model, wherein the model is able to recognize words or parts of words (e.g., phonemes) and is trained to produce a corresponding sound to the phonemes or words.

In some embodiments, the neural TTS model 146 is adapted for a particular target speaker. For example, target speaker data (e.g., target speaker data 141) comprising audio data including spoken words and/or phrases obtained and/or recorded from a target speaker. An example of a neural TTS model 1000 is described in more detail below with reference to FIG. 10.

In some instances, the target speaker data 141 is formatted as training data, wherein the neural TTS model 146 is trained (or pre-trained) on the target speaker training data such that the neural TTS model 146 is able to produce speech data in the voice timbre and prosody style of the target speaker based on input text. In some embodiments, the neural TTS model 146 is speaker independent, meaning that it produces arbitrary speech data based on one or a combination of target speaker datasets (e.g., target speaker data 141). In some embodiments, the neural TTS model 146 is a multi-speaker neural network, meaning that the model is configured to produce speech data corresponding to a plurality of discrete speakers/speaker profiles. In some embodiments, the neural TTS model 146 is speaker dependent, meaning that the model is configured to produce speech primarily for a particular target speaker.

In some embodiments, the neural TTS model 146 is further trained and/or adapted such that the model is trained on training data comprising and/or based on a combination of target speaker data 141 and source speaker data 142, such that the neural TTS model 146 is configured to produce speech data in the voice timbre of the target speaker and the prosody style of the source speaker data.

In some embodiments, a database is provided which stores a plurality of voice timbre profiles (e.g., voice timbres 149) corresponding to a plurality of target speakers and a plurality of prosody styles (e.g., prosody styles 148) corresponding to a plurality of source speakers. In some instances, a user is able to select a particular voice timbre profile from the plurality of voice timbre profiles and select a prosody style from the plurality of prosody styles, wherein the neural TTS model 146 is configured to convert input text to speech data based on the particular voice timbre and particular prosody style. In such embodiments, it should be appreciated that there are any number of combinations of voice timbres 149 and prosody styles 148.

In some embodiments, a newly generated prosody style is based on a combination of previously stored prosody styles and/or a combination of source speaker datasets. In some embodiments, a newly generated voice timbre is based on a combination of previously stored voice timbres and/or a combination of target speaker datasets.

In some embodiments, a prosody style refers to a set, or a sub-set, of prosody attributes. In some instances, the prosody attributes correspond to a particular speaker (e.g., a target speaker or a source speaker). In some instances, a particular prosody style is assigned an identifier, for example, a name identifier. For example, the prosody styles are associated with a name identifier that identifies the speaker from which the prosody style is generated/obtained. In some examples, the prosody styles comprise descriptive identifiers, such as story-telling style (e.g., a speaking manner typically employed when reading a novel aloud or relating a story as part of a speech or conversation), newscaster style (e.g., a speaking manner typically employed by a newscaster, in delivering news in a factual, unemotional, direct style), presentation style (e.g., a formal speaking style typically employed when a person is giving a presentation), conversational style (e.g., a colloquial speaking style typically employed by a person when speaking to a friend or relative), etc. Additional styles include, but are not limited to a serious style, a casual style and a customer service style. It will be appreciated that any other type of speaking style, besides those listed, can also be used for training an acoustic model with corresponding training data of said style(s).

In some embodiments, the prosody styles are attributed to typical human-expressed emotions such as a happy emotion, a sad emotion, an excited emotion, a nervous emotion or other emotion. Oftentimes, a particular speaker is feeling a particular emotion and thus the way the speaker talks is affected by the particular emotion in ways that would indicate to a listener that the speaker is feeling such an emotion. As an example, a speaker who is feeling angry may speak in a highly energized manner, at a loud volume, and/or in truncated speech. In some embodiments, a speaker may wish to convey a particular emotion to an audience, wherein the speaker will consciously choose to speak in a certain manner. For example, a speaker may wish to instill a sense of awe into an audience and will speak in a hushed, reverent tone with slower, smoother speech. It should be appreciated that in some embodiments, the prosody styles are not further categorized or defined by descriptive identifiers.

In some embodiments, the hardware storage device 140 stores a voice conversion model 147, which is configured to convert speech data from a first speaker (e.g., a source speaker) into speech that sounds like a second speaker (e.g., a target speaker). In some embodiments, the converted speech data is adapted to the voice timbre of the target speaker, while maintaining the prosody style of the source speaker. In other words, the converted speech mimics the voice (i.e., voice timbre) of the target speaker, but retains one or more prosody attributes of the source speaker (e.g., speaking duration, pitch, energy, etc.).

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a conversion engine 152, a feature extraction engine 153, a training engine 154, an alignment engine 155, an implementation engine 156, a refinement engine 157 or a decoding engine 158 which are individually and/or collectively configured to implement the different functionality described herein.

For example, in some instances, the data retrieval engine 151 is configured to locate and access data sources, databases, and/or storage devices comprising one or more data types from which the data retrieval engine 151 can extract sets or subsets of data to be used as training data. In some instances, the data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with remote/third party systems (e.g., remote/third party systems 120) comprising remote/third party datasets and/or data sources. In some instances, these data sources comprise audiovisual services that record speech, text, images, and/or video to be used in cross-speaker style transfer applications.

In some embodiments, the data retrieval engine 151 accesses electronic content comprising target speaker data 141, source speaker data 142, PPG data 143, spectrogram data 144, prosody feature data 145, prosody styles 148, and/or voice timbres 149.

In some embodiments, the data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired natural language understanding application.

In some instances, the data retrieval engine 151 locates, selects, and/or stores raw unstructured source data (e.g., speaker data), wherein the data retrieval engine 151 is in communication with one or more other ML engines and/or models included in computing system 110 (e.g., conversion engine 152, feature extraction engine 153, training engine 154, etc.). In such instances, the other engines in communication with the data retrieval engine 151 are able to receive data that has been retrieved (i.e., extracted, pulled, etc.) from one or more data sources such that the received data is further augmented and/or applied to downstream processes.

For example, in some embodiments, the data retrieval engine 151 is in communication with the conversion engine 152. The conversion engine 152 is configured for converting between data types and to configure data raw data into training data usable for training any one of the machine learning models described herein. The conversion model beneficially converts data to facilitate an increase in efficiency and accuracy of the training of the models. In some embodiments, the conversion engine 152 is configured to receive speaker data (e.g., source speaker data 142) and convert the raw speaker data into waveform data. In addition, the conversion engine 152 is configured to convert the waveform of the source speaker data into PPG data. Additionally, or alternatively, in some embodiments, the conversion engine 152 is configured to facilitate the conversion of speech data from a first speaker to a second speaker (e.g., voice conversion via the voice conversion model).

In some embodiments, computing system 110 stores and/or access a feature extraction engine 153. The feature extraction engine 153 is configured to extract features and/or attributes from the target speaker data 141 and the source speaker data 142. These extracted attributes include attributes corresponding to the phonetic information, the prosody information and/or the timbre information. In some embodiments, the feature extraction engine 153 extracts one or more additional prosody features for the source speaker data including pitch contours and/or energy contours of the source speaker data. In such embodiments, the extracted attributes are included in the training data sets configured to train the machine learning models.

In some embodiments, the feature extraction engine 153 is configured to receive electronic content including a plurality of prosody features and/or attributes, wherein the feature extraction engine 153 is configured to detect discrete attributes and distinguish particular attributes from one another. For example, the feature extraction engine 153 is able to, in some instances, to distinguish between pitch attributes corresponding to pitch contour of the source speaker data and energy attributes corresponding to the energy contour of the source speaker data.

In some embodiments, the data retrieval engine 151, the conversion engine 152 and/or the feature extraction engine 153 is/are in communication with the training engine 154. The training engine 154 is configured to receive one or more sets of training data from the data retrieval engine 151, the conversion engine 152 and/or the feature extraction engine 153. After receiving training data relevant to a particular application or task, the training engine 154 trains one or more models on the training data for the particular natural language understanding applications, speech recognition applications, speech generation applications, and/or cross-speaker style transfer applications. In some embodiments, the training engine 154 is configured to train a model via unsupervised training or supervised training.

In some embodiments, based on the attributes extracted by the feature extraction engine 153, the training engine 154 is able to adapt the training processes and methods such that the training process produces a trained model configured to generate specialized training data that reflects the inclusion of particular features and attributes that contribute to the desired prosody style. For example, the inclusion of the pitch attributes will help determine a fundamental frequency at which to generate the spectrogram data, while the inclusion of the energy attributes will help determine at what volume (or variations in volume) to generate the spectrogram data. Each attribute contributes differently to the overall prosody style.

For example, in some embodiments, the training engine 154 is configured to train a model (e.g., a neural TTS model 146, see also model 1000 of FIG. 10) with training data (e.g., spectrogram data 144) such that the machine learning model is configured to generate speech from arbitrary text as according to embodiments described herein. In some examples, the training engine 154 is configured to train the voice conversion model 147, or components of the voice conversion model, on speaker data (e.g., target speaker data 141, source speaker data 142, or multi-speaker data).

In some embodiments, the conversion engine 152 and/or the training engine 154 is/are in communication with the alignment engine 155. The alignment engine 155 configured to align the waveform of the source speaker data 142 to the PPG data 143 at a specific granularity (e.g., a frame-based granularity). The alignment engine 155 is also configured to align one or more additional prosody features extracted from the source speaker data (e.g., pitch, energy, speaking rate, speaking duration) to the PPG data 143 at the same granularity used to align the PPG data 143 to the source speaker data 142. Aligning the data in the manner beneficially maintains the integrity of the prosody style of the source speaker during the style transfer.

In some embodiments, the computing system 110 includes a refinement engine 157. In some instances, the refinement engine 157 is in communication with the training engine. The refinement engine 157 is configured to refine the voice conversion model, or a component of the voice conversion model (e.g., the PPG-spectrogram component) by adapting the model component (or sub-model) to a target speaker using target speaker data 141.

In some embodiments, the computing system 110 includes a decoding engine 158 (or an encoding-decoding engine) configured to encode and decode data. Generally, a decoder is neural network that takes the feature map, vector and/or tensor from an encoder and generates a best match to the intended input. In some embodiments, the encoding/decoding engine 158 is configured to encode text input to the neural TTS model 146 and decode the encoding to convert the input text into the mel-spectrum. (See FIG. 10). In some embodiments, the encoding/decoding engine 158 is configured to encode PPG data 143 as part of the spectrogram generation process. (See FIG. 12).

In some embodiments, the computing system 110 includes a separate encoding engine (not shown) configured to learn and/or operate a shared encoder between one or more models. In some embodiments, the encoder is neural network that takes the input and outputs a feature map, a vector and/or a tensor. In some embodiments, the shared encoder is part of an encoder-decoder network.

In some embodiments, the decoding engine 158 is in communication with a refinement engine 157 that is configured to refine the encoder/decoder network of the neural TTS model 146 by employing a feedback loop between the encoder and decoder. The neural TTS model 146 is then trained and refined by iteratively minimizing the reconstruction loss from transforming the input text into speech data, and speech data back into text data. In some embodiments, the refinement engine 157 is also configured to refine and/or optimize any one or a combination of machine learning engines/models included in the computing system 110 to facilitate an increase in efficiency, efficacy, and accuracy of the engines/models.

In some embodiments, the computing system 110 includes an implementation engine 156 in communication with any one of the models and/or ML engines 150 (or all of the models/engines) included in the computing system 110 such that the implementation engine 156 is configured to implement, initiate or run one or more functions of the plurality of ML engines 150. In one example, the implementation engine 156 is configured to operate the data retrieval engines 151 so that the data retrieval engine 151 retrieves data at the appropriate time to be able to generate training data for the training engine 154.

In some embodiments, the implementation engine 156 facilitates the process communication and timing of communication between one or more of the ML engines 150. In some embodiments, the implementation engine 156 is configured to implement a voice conversion model to generate spectrogram data. Additionally, or alternatively, the implementation engine 156 is configured to perform a natural language understanding task by executing the transforming text into speech data (e.g., via the neural TTS model).

In some embodiments, the computing system is in communication with remote/third party systems 120 comprising one or more processor(s) 122 and one or more hardware storage device(s) 124. It is anticipated that, in some instances, the remote/third party systems 120 further comprise databases housing data that could be used as training data, for example, external speaker data. Additionally, or alternatively, the remote/third party systems 120 include machine learning systems external to the computing system 110. In some embodiments, the remote/third party systems 120 are software programs or applications.

Figure 2:
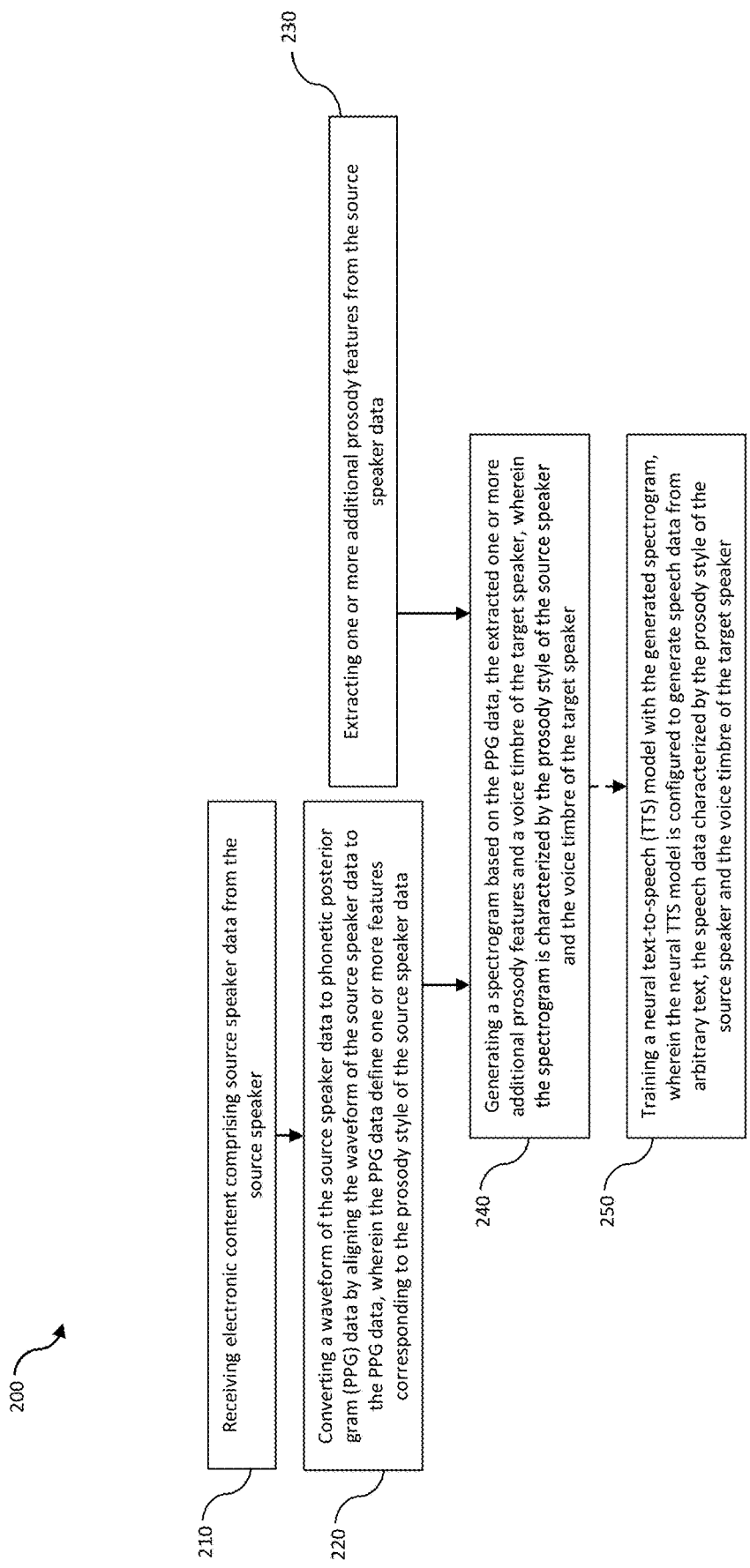
FIG. 2 illustrates one embodiment of a flow diagram having a plurality of acts associated with methods for generating machine learning training data comprising spectrogram data for a target speaker.

Attention will now be directed to FIG. 2 which illustrates a flow diagram 200 that includes various acts associated with exemplary methods that can be implemented by computing systems, such as computing system 110 described above in reference to FIG. 1. As shown in FIG. 2, the flow diagram 200 includes a plurality of acts (act 210, act 220, act 230, act 240, and act 250) which are associated with various methods for generating training data and training a machine learning model for natural language understanding tasks, for example, transforming text into speech data. Examples of claimed components claimed in the acts are described in reference to features of a computing system, for example, computing system 110 of FIG. 1.

As shown in FIG. 2, the flow diagram 200 and corresponding methods include an act of a computing system (e.g., computing system 110) receiving electronic content comprising source speaker data (e.g., source speaker data 142) from the source speaker (act 210). After receiving the source speaker data, the computing system converts a waveform of the source speaker data to phonetic posterior gram (PPG) data (e.g., PPG data 143) by aligning the waveform of the source speaker data to the PPG data, wherein the PPG data define one or more features corresponding to the prosody style of the source speaker data (act 220).

The flow diagram 200 also includes an act of extracting one or more additional prosody features (e.g., prosody feature data 145) from the source speaker data (act 230). Subsequently, the computing system generates a spectrogram (e.g., spectrogram data 144) based on the PPG data, the extracted one or more additional prosody features and a voice timbre of the target speaker, wherein the spectrogram is characterized by the prosody style (e.g., prosody style 148) of the source speaker and the voice timbre (e.g., voice timbre 149) of the target speaker (act 240). Spectrograms, such as audio or voice spectrograms are well-known to those in the industry and include digital representations of sound attributes such as the spectrum of frequencies for a particular sound or other signal as they vary over time. In the current embodiments, the spectrograms are characterized by a particular prosody style (e.g., prosody of the source speaker) and voice timbre (e.g., voice timbre of the target speaker).

In some embodiments, the computing system 250 trains neural text-to-speech (TTS) model (e.g., neural TTS model 146) with the generated spectrogram, wherein the neural TTS model is configured to generate speech data from arbitrary text, the speech data characterized by the prosody style of the source speaker and the voice timbre of the target speaker (act 250).

Figure 10:
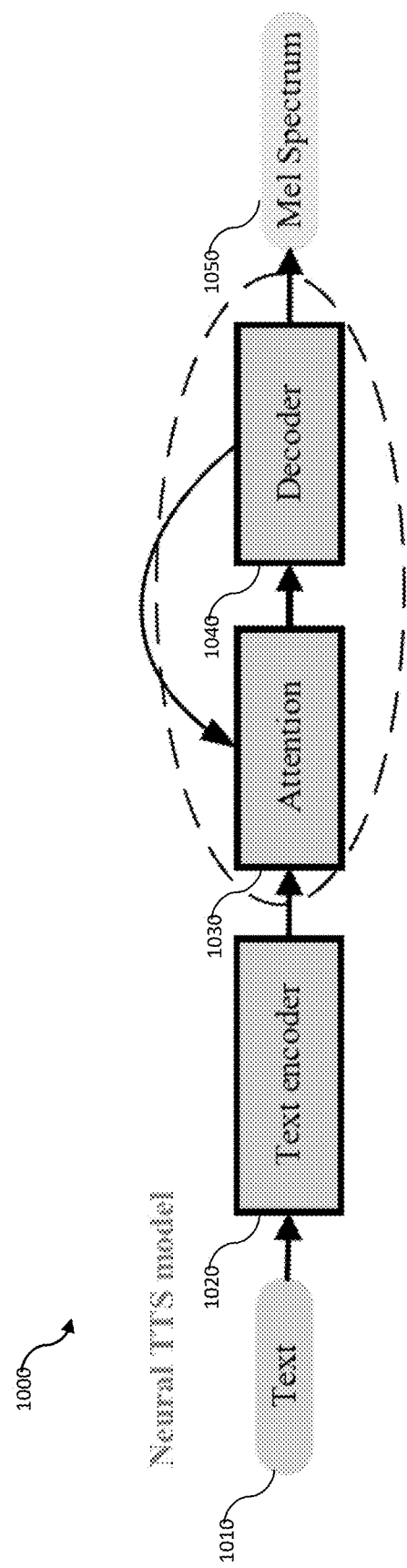
FIG. 10 illustrates one embodiment of an example configuration for a neural TTS model according to embodiments disclosed herein.

One example of a TTS model that can be trained is a neural TTS model 1000, such as shown in FIG. 10, which includes a text encoder 1020 and a decoder 1040, and wherein attention 1030 is used by the model to direct and inform the encoding-decoding at various layers of the model (e.g., a phoneme and/or frame level, and a context level). The neural TTS model 1000 is able to generate output (e.g., spectrogram data or speech waveform data) in the Mel spectrum such that the generated output is speech data based on the input text 1010. The Mel spectrum 1050 is characterized by the voice timbre of a first speaker (e.g., target speaker) with the prosody style of a second speaker (e.g., source speaker).

With regard to the acts described in FIG. 2, it will be appreciated that they can be performed in different ordering than the ordering that is explicitly shown in the flow diagram 200. For instance, while acts 210 and 220 may performed in parallel with act 230, in some alternative embodiments, acts 210 and 220 are performed in series with acts 230, 240, and 250.

It will also be appreciated that the act of performing a natural language understanding task may occur with the same computer device(s) that performed the aforementioned acts (e.g., acts 210-250), or alternatively by one or more different computer device(s) of a same distributed system.

Figure 3:
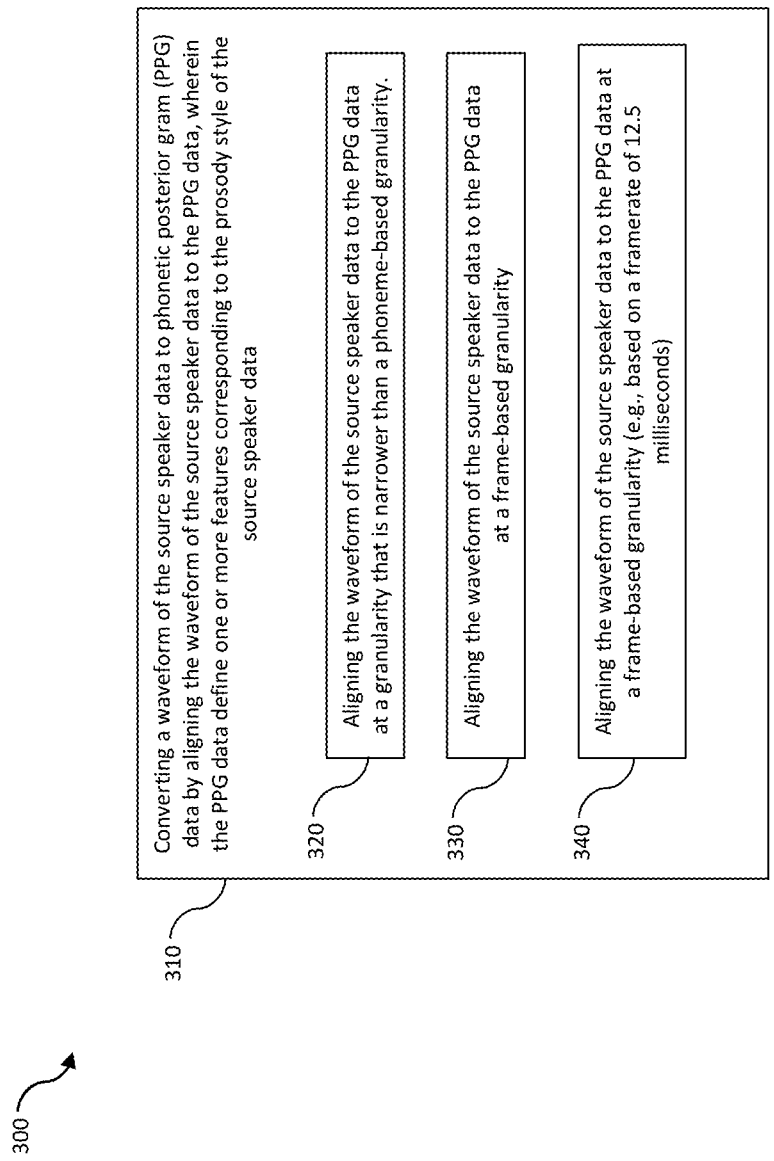
FIG. 3 illustrates an embodiment of a diagram having a plurality of acts associated with various methods for aligning a waveform of source speaker data with corresponding phonetic posterior gram (PPG) data.

Attention will now be directed to FIG. 3, which illustrates a diagram 300 that includes variations of an act associated with exemplary methods that can be implemented by computing systems, such as computing system 110 described above in reference to FIG. 1. As shown in FIG. 3, the diagram 300 includes a plurality of acts (act 320, act 330, and act 340) which are associated with various methods for performing an act (act 310) for converting waveform data into PPG data. Examples of claimed components claimed in the acts are described in reference to features of a computing system, for example, computing system 110 of FIG. 1. It should be appreciated that in some embodiments act 310 is representative of act 220 of FIG. 2.

For example, diagram 300 includes in an act of converting a waveform of the source speaker to phonetic poster gram (PPG) data (e.g., PPG data 143) by aligning the waveform of the source speaker data to the PPG data, wherein the PPG data define one or more features corresponding to the prosody style of the source speaker data (act 310).

In some embodiments, the computing system aligns the waveform of the source speaker data at a granularity that is narrower than a phoneme-based granularity (act 320). In some embodiments, the computing system aligns the waveform of the source speaker data to the PPG data at a frame-based granularity (act 330). In some embodiments, the computing system aligns the waveform data of the source speaker data to the PPG data at a frame-based granularity based on a particular framerate (act 340), such as a framerate of 12.5 milliseconds, for example, or a framerate of a shorter or longer duration.

Figure 4:
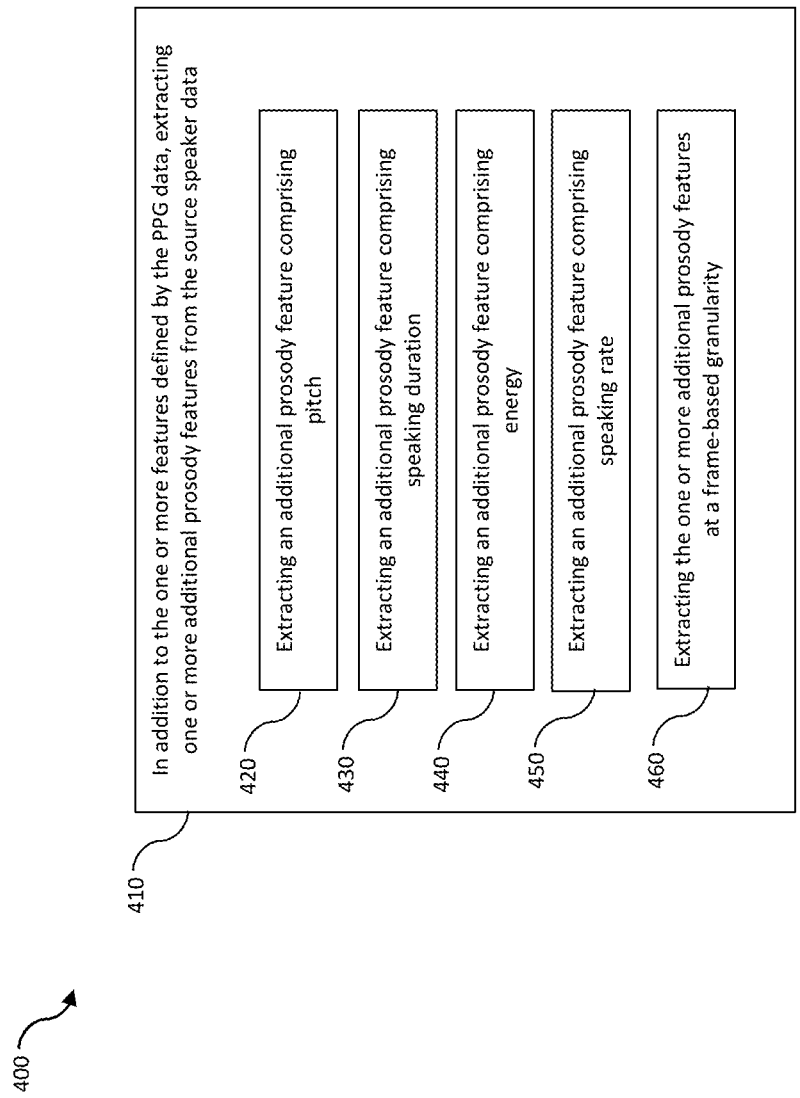
FIG. 4 illustrates an embodiment of a diagram having a plurality of acts associated with various methods for extracting additional prosody features from the source speaker data.

Attention will now be directed to FIG. 4, which illustrates a diagram 400 that includes variations of an act associated with exemplary methods that can be implemented by computing systems, such as computing system 110 described above in reference to FIG. 1. As shown in FIG. 4, the diagram 400 includes a plurality of acts (act 420, act 430, act 440, act 450, and act 460) which are associated with various methods for performing an act (act 410) of extracting additional prosody features. In some instances, act 410 is representative of act 230 of FIG. 2.

For example, diagram 400 includes an act of, in addition to the one or more features defined by the PPG data (e.g., PPG data 143), extracting one or more additional prosody features (e.g., prosody feature data 145) from the source speaker data (e.g., source speaker data 142) (act 410). In some embodiments, the computing system extracts an additional prosody feature comprising pitch (act 420). Additionally, or alternatively, the computing system extracts an additional prosody feature comprising speaking duration (act 430). Additionally, or alternatively, the computing system extracts an additional prosody feature comprising energy (act 440). Additionally, or alternatively, the computing system extracts an additional prosody feature comprising speaking rate (act 450). Furthermore, in some embodiments, the computing system extracts the one or more additional prosody features at a frame-based granularity (act 460).

Figure 5:
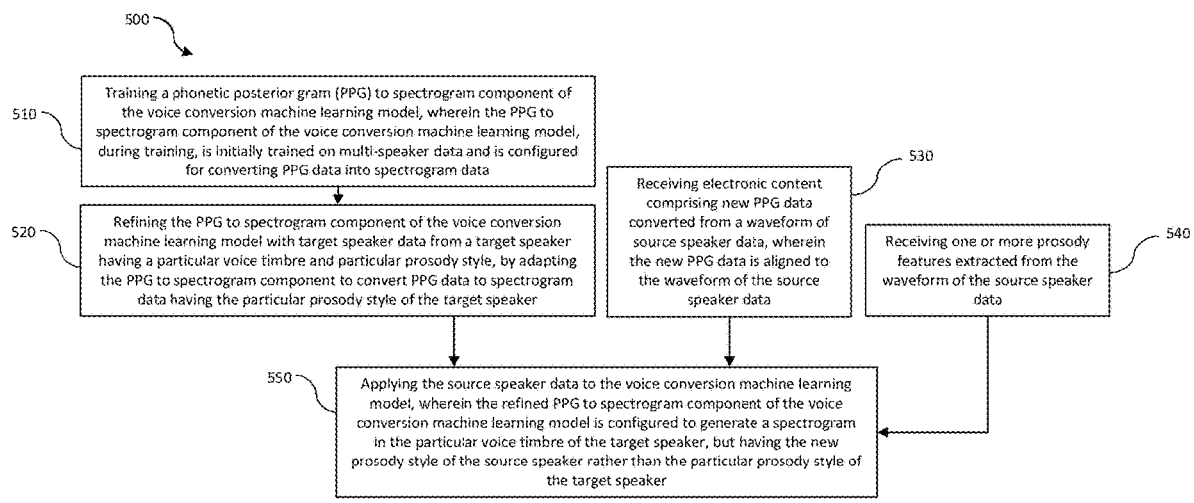
FIG. 5 illustrates one embodiment of a flow diagram having a plurality of acts associated with methods for training a voice conversion machine learning model, including a PPG-spectrogram component of the voice conversion machine learning model.

Attention will now be directed to FIG. 5, which illustrates a flow diagram 500 that includes various acts associated with exemplary methods that can be implemented by computing systems, such as computing system 110 described above in reference to FIG. 1. As shown in FIG. 5, the flow diagram 500 includes a plurality of acts (act 510, act 520, act 530, act 540, and act 550) which are associated with various methods for training a machine learning model for natural language understanding tasks, for example, training and using a PPG-spectrogram component of a voice conversion machine learning model to generate spectrogram data.

As shown in FIG. 5, the flow diagram 500 and corresponding methods include an act of a computing system (e.g., computing system 110) training a phonetic posterior gram (PPG) to spectrogram component of the voice conversion machine learning model, wherein the PPG to spectrogram component of the voice conversion machine learning model, during training, is initially trained on multi-speaker data and is configured for converting PPG data into spectrogram data (act 510).

After training the PPG to spectrogram component, the computing system refines the PPG to spectrogram component of the voice conversion machine learning model with target speaker data from a target speaker having a particular voice timbre and particular prosody style, by adapting the PPG to spectrogram component to convert PPG data to spectrogram data having the particular prosody style of the target speaker (act 520).

Flow diagram 500 also includes an act of receiving electronic content comprising new PPG data converted from a waveform of source speaker data, wherein the new PPG data is aligned to the waveform of the source speaker data (act 530) and an act of receiving one or more prosody features extracted from the waveform of the source speaker data (act 540). In some embodiments, acts 510, 520, 530, and/or 540 are performed in series. In some embodiments, as shown, acts 510 and 520 are performed in series and acts 530 and 540 are performed independently of each other and independently of acts 510 and 520.

Subsequent to the performing of acts 510-540, the computing system applies the source speaker data to the voice conversion machine learning model, wherein the refined PPG to spectrogram component of the voice conversion machine learning model is configured to generate a spectrogram in the particular voice timbre of the target speaker, but having the new prosody style of the source speaker rather than the particular prosody style of the target speaker (act 550). In some embodiments, act 530 is representative of acts 210 and 220 of FIG. 2. In some embodiments, act 540 is representative of act 230 of FIG. 2. In some embodiments, act 240 of FIG. 2 for generating spectrogram data is brought about by one or more acts included in method 500.

Figure 6:
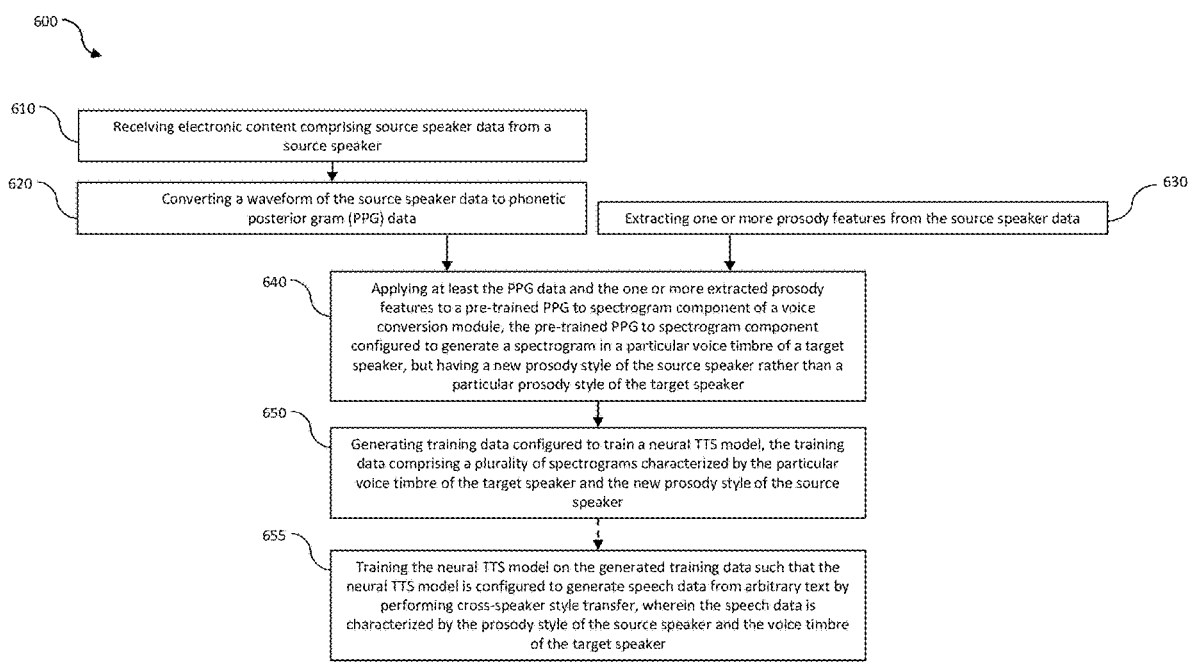
FIG. 6 illustrates one embodiment of a flow diagram having a plurality of acts associated with methods for training a neural TTS model on spectrogram data generated for a target speaker in a particular prosody style.

Attention will now be directed to FIG. 6, which illustrates a flow diagram 600 that includes various acts associated with exemplary methods that can be implemented by computing systems, such as computing system 110 described above in reference to FIGS. 1, 8-12. As shown in FIG. 6, the flow diagram 600 includes a plurality of acts (act 610, act 620, act 630, act 640, and act 650) which are associated with various methods for training a machine learning model for natural language understanding tasks, for example, generating training data configured to train a neural TTS model.

By way of example, method 600 includes an act of receiving electronic content comprising source speaker data (e.g., source speaker data 142) from a source speaker (act 610). A computing system then converts the waveform of the source speaker data to phonetic poster gram (PPG) data (e.g., PPG data 143). Method 600 further includes an act of extracting one or more prosody features (e.g., prosody feature data 145) from the source speaker data (act 630).

Subsequent to converting the waveform to PPG data and extracting the additional prosody features (e.g., using the MFCC-PPG speaker independent model of FIG. 9), the computing system applies at least the PPG data and the one or more extracted prosody features to a pre-trained PPG to spectrogram component (e.g., PPG-Mel model of FIG. 9) of a voice conversion module, the pre-trained PPG to spectrogram component configured to generate a spectrogram (e.g., spectrogram data) in a particular voice timbre (e.g., voice timbre 149) of a target speaker, but having a new prosody style (e.g., prosody style 148) of the source speaker rather than a particular prosody style of the target speaker (act 640).

The computing system also generates training data configured to train a neural TTS model (e.g., neural TTS model 146), the training data comprising a plurality of spectrograms characterized by the particular voice timbre of the target speaker and the new prosody style of the source speaker (act 650).

Optionally, in some embodiments, the computing system trains the neural TTS model on the generated training data such that the neural TTS model is configured to generate speech data from arbitrary text by performing cross-speaker style transfer, wherein the speech data is characterized by the prosody style of the source speaker and the voice timbre of the target speaker (act 655).

Figure 7:
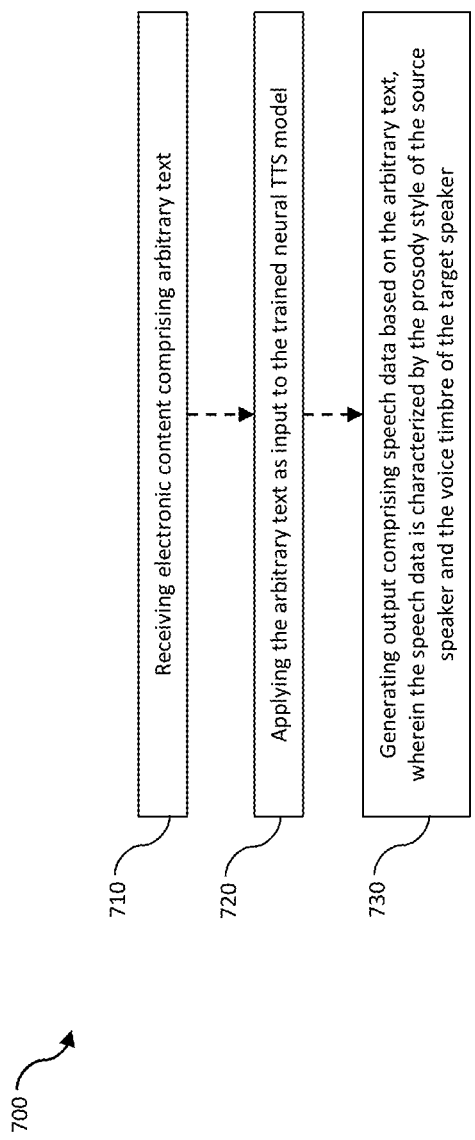
FIG. 7 illustrates one embodiment of a flow diagram having a plurality of acts for generating speech data from text using a trained TTS model.

Attention will now be directed to FIG. 7, which illustrates a flow diagram 700 that includes various acts associated with exemplary methods that can be implemented by computing systems, such as computing system 110 described above in reference to FIG. 1 and FIG. 10. As shown in FIG. 7, the flow diagram 700 includes a plurality of acts (act 710, act 720, and act 730) which are associated with various methods for generating speech output from a TTS model based on input text.

For example, flow diagram 700 includes an act of receiving electronic content comprising arbitrary text (e.g., text 1010) (act 710). The computing system then applies the arbitrary text as input to the trained neural TTS model (e.g., TTS model 1000). Using the trained neural TTS model, the computing system generates output (e.g., mel spectrum data 1040) comprising speech data based on the arbitrary text, wherein the speech data is characterized by the prosody style of the source speaker and the voice timbre of the target speaker (act 730). It should be appreciated that the trained neural TTS model, in some embodiments, is trained on spectrogram data generated by methods disclosed herein, for example, method 200 and/or method 600.

Figure 8:
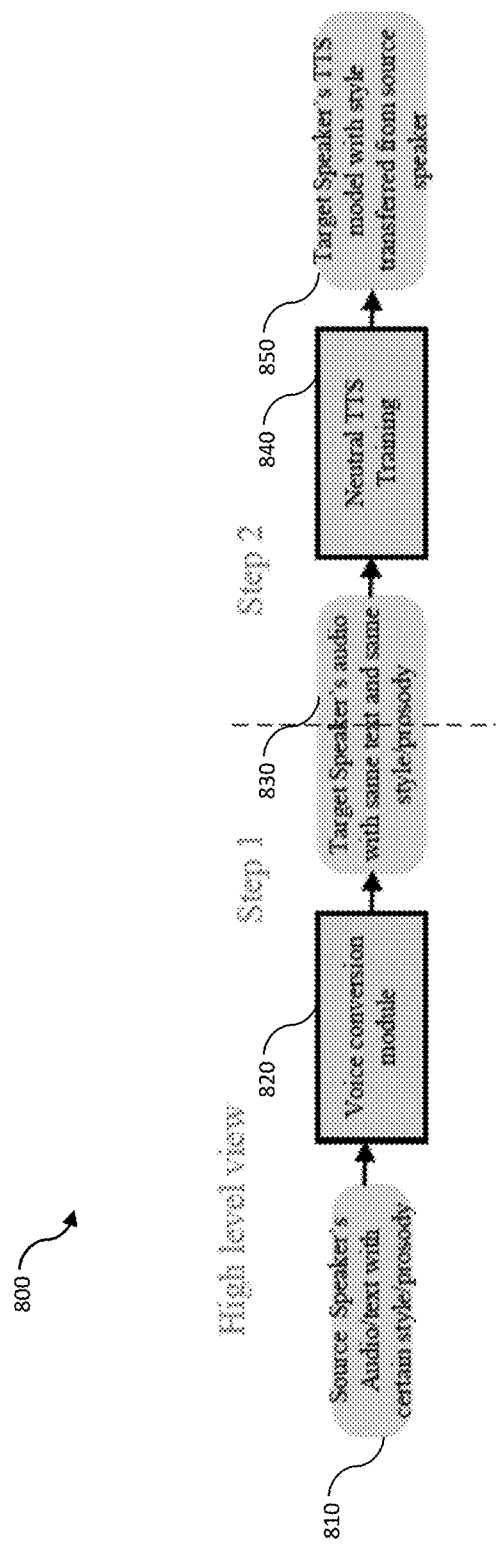
FIG. 8 illustrates one embodiment of a process flow diagram showing a high-level view of generating training data and training a neural TTS model.

Attention will now be directed to FIG. 8. FIG. 8 illustrates one embodiment of a process flow diagram showing a high-level view of generating training data and training a neural TTS model. For example, the process for generating speech data that is characterized by the voice timbre of the target speaker and the prosody style of a source speaker is brought about, at least in part, based on a dual-step process.

First, a source speaker's data 810 (e.g., source speaker data 142) is obtained (e.g., audio/text) that corresponds to a particular source prosody style and particular source voice timbre. This data is applied to a voice conversion module 820 (e.g., voice conversion model 147) which is configured to convert the source speaker speech data into target speaker speech data 830 by converting the timbre of the source speaker to the voice timbre of the target speaker, while retaining the prosody style of the source speaker. In step two, the data (target speaker data 830) is used to train a neural TTS model (e.g., TTS model 146) (see neural TTS training 840), wherein the neural TTS model is able to generate speech data 850 from text input. The speech data is TTS data in the voice timbre of the target speaker with the style that was transferred from the source speaker.

Figure 9:
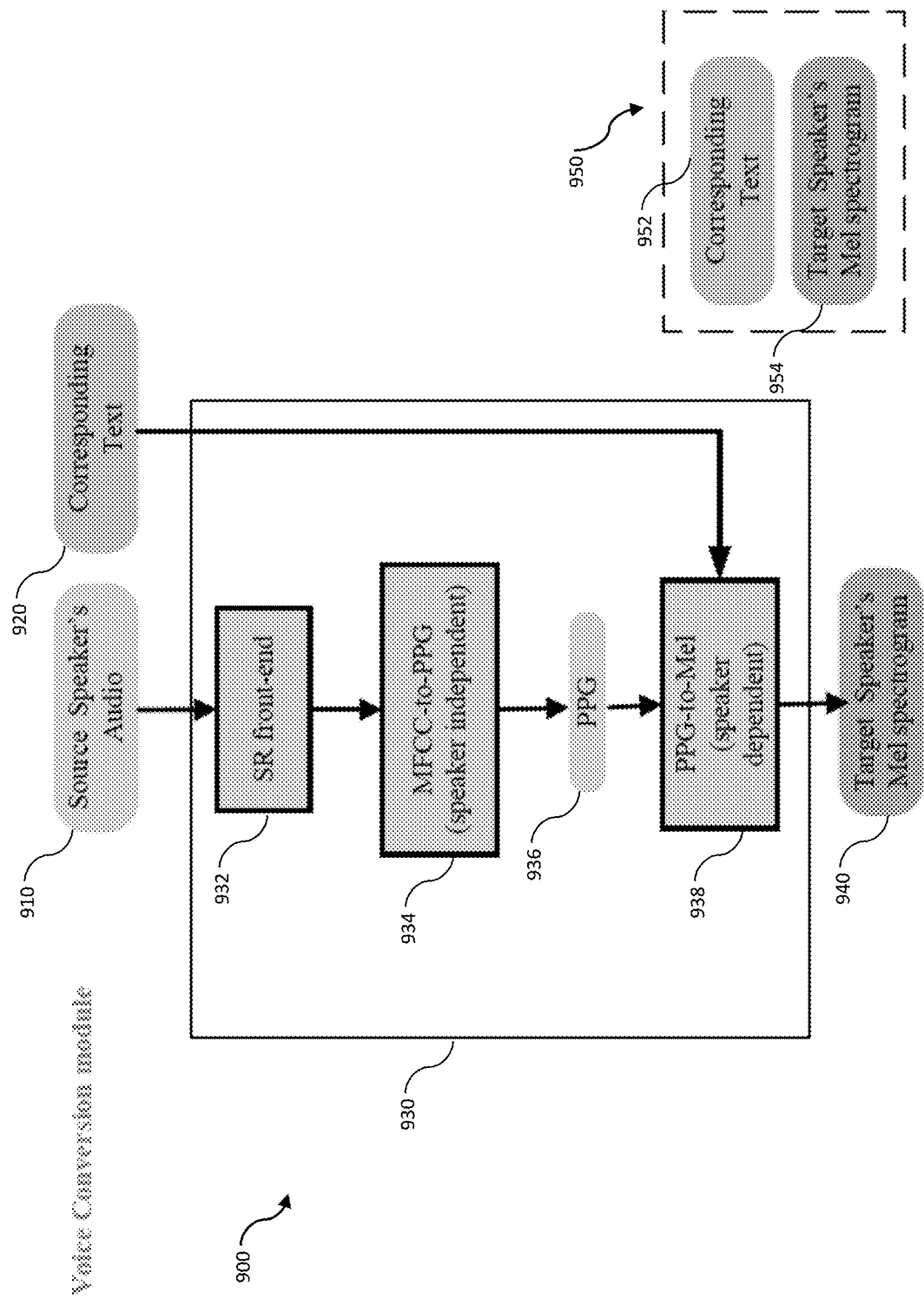
FIG. 9 illustrates one embodiment of an example process flow diagram including training a voice conversion model within a speech recognition module. The voice conversion model includes a MFCC-PPG component and a PPG-Mel component.

Attention will now be directed to FIG. 9 illustrates one embodiment of an example process flow diagram 900 including training a voice conversion model 930 within a speech recognition module (see FIG. 10). The voice conversion model includes a MFCC-PPG component 934 and a PPG-Mel component 938. For example, source speaker audio (e.g., source speaker data 142) is obtained from a source speaker, including the corresponding text 920 that corresponds to the source speaker's audio 910. The source speaker's audio 910 is received by a speech recognition (SR) front end 932 which is configured to perform signal processing on the input speech including, but not limited to, signal denoising and feature extraction, for example, extracting MFCCs. The speech is also converted to a waveform format, or other signal-based audio representation. In some embodiments, the waveform is converted to the Mel-scale.

The voice conversion model 930 also includes an MFCC to PPG model configured to convert the speech data into PPG data 936 (e.g., PPG data 143). In some embodiments, the MFCC to PPG model 934 is speaker independent, wherein this component 934 is pre-trained using multi-speaker data. Beneficially, this model does not need to be further refined or adapted to the source speaker's audio.

Figure 11:
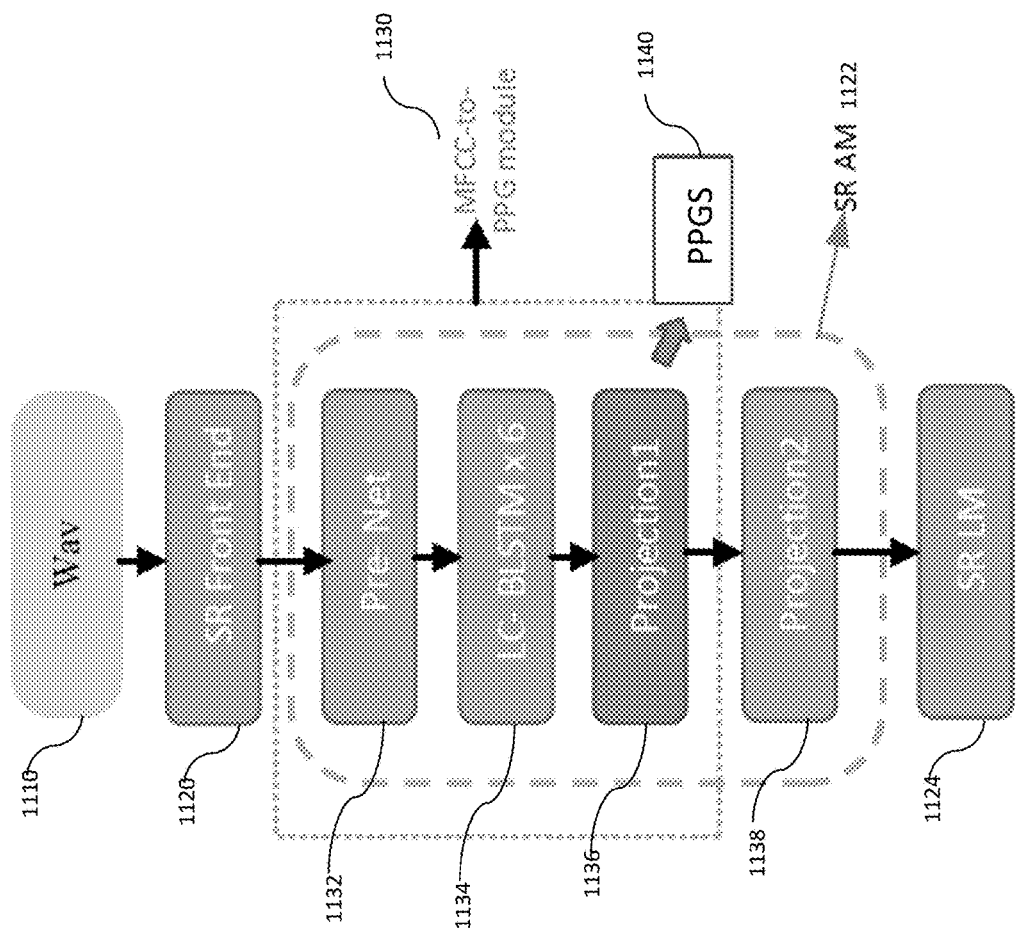
FIG. 11 illustrates one embodiment of an example waveform to PPG component (e.g., MFCC-PPG), wherein the computing system generates PPG data.

Referring to FIG. 11, one embodiment of an example waveform to PPG component (e.g., MFCC-PPG) is illustrated, wherein the computing system generates PPG data.

In some embodiments, the MFCC-PPG model 1130 is part of a speech recognition (SR) model (e.g., SR front end 1120, SR acoustic model (AM) 1122, and SR language model (LM) 1124). During training of the sub-models or components, the full SR AM is trained. Once the SR AM is trained, only the MFCC-to-PPG model 1130 is used during the spectrogram generation process and TTS model training. For example, the waveform 1110 obtained from the source speaker data is received by a SR front end configured to perform signal processing of the input speech include in the source speaker audio. After being processed by the SR front end 1120, the data is input to the MFCC-PPG module 1130. The MFCC-PPG module 1130 includes several components and/or layers, for example, a Pre-Net layer 1132, a plurality of LC-BLSTM (latency-controlled bidirectional long short-term memory) layers, and a first projection 1136. The PPG data 1140 is then extracted from the first projection (output of the LC-BLSTM layers). The PPG data comprises phonetic information and prosody information (e.g., speaking duration/speaking rate) at a frame-based granularity.

Once the PPG data 936 is generated, the PPG-Mel model 938 receives the PPG data. The PPG-Mel model 938, or more broadly, the PPG-spectrogram model is configured to generate spectrogram data based on the received PPG data 936. The PPG to Mel model is initially a source PPG to Mel model, wherein the source PPG to Mel model 938 is trained on multi-speaker data. After the initial training, the PPG to Mel model 938 is then refined and/or adapted to be speaker dependent for a particular (or additional) target speaker. This is done by training the PPG to Mel model 938 on a target speaker's data (e.g., target speaker data 141). In this manner, the PPG-Mel model is able to generate spectrograms, or mel-spectrograms, in the target speaker's timbre with increased quality due to the speaker dependent adaptation.

In some embodiments, the source PPG to spectrogram is always speaker-dependent, for example, the multi-speaker source model is configured to generate spectrograms for many speakers (e.g., the speakers that occur in training data) or has already been refined with target speaker data (in this case it is configured to generate spectrogram mostly configured for the target speaker). In some alternate embodiments, it is possible to train a speaker-independent multi-speaker source PPG-to-spectrogram model, wherein the generated spectrograms are generated for an averaged voice.

Thus, the now refined/adapted PPG to Mel model is used to convert the PPG data 936 obtained from the source speaker's audio 910 and generate a spectrogram using the target speaker's mel spectrum (which is a spectrogram where the frequencies are converted according to the mel scale, which is a scale known to those in the industry) but with the prosody style of the source speaker. Other spectrums than mel spectrums can also be used in some embodiments. The target speaker's mel spectrogram 954 (having the prosody style transferred from the source speaker), along with the corresponding text 952 is configured as training data 950 that is able to train a neural TTS model (e.g., neural TTS model 1000) to generate speech data having the same characteristics as the newly generated spectrograms (e.g., voice timbre of the target speaker and prosody style of the source speaker). In some embodiments, the spectrogram data is converted to the Mel scale such that it is a Mel-spectrogram (e.g., Target speaker's Mel spectrogram 940).

Figure 12:
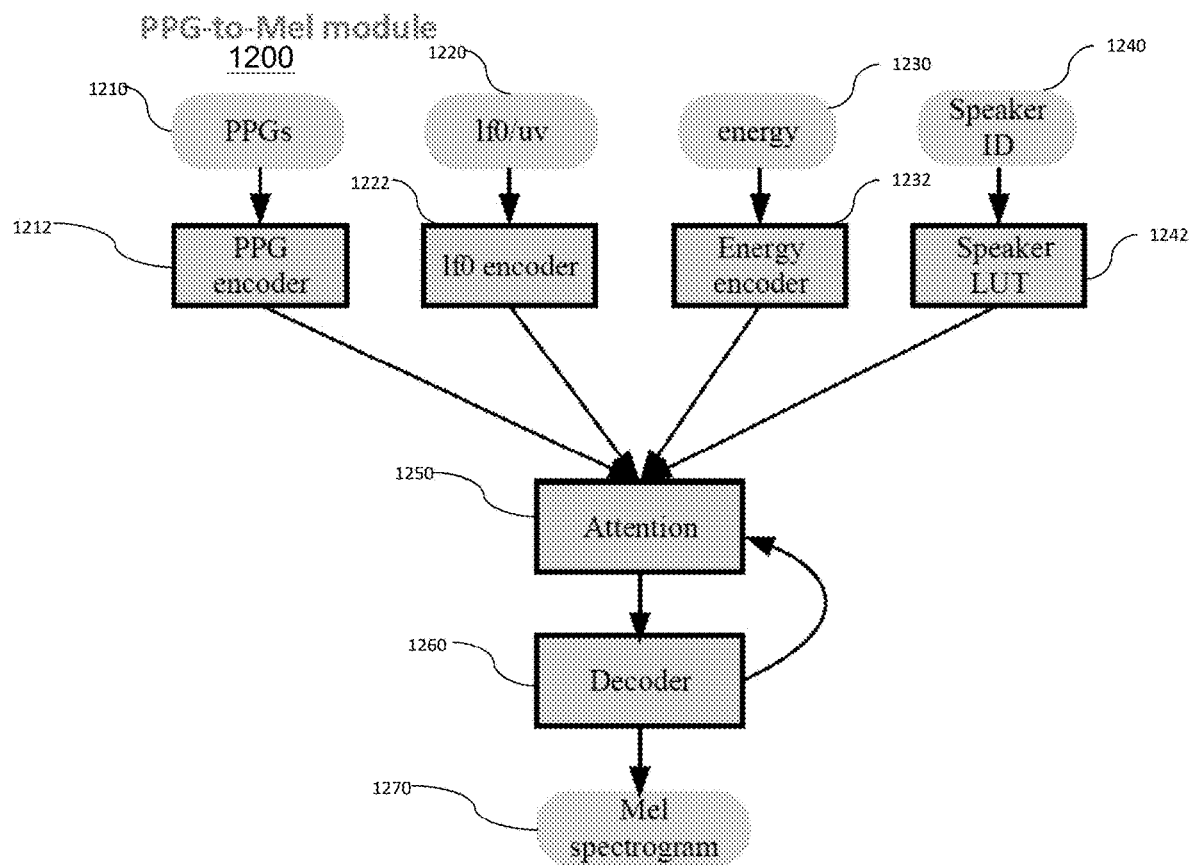
FIG. 12 illustrates one embodiment of an example PPG-spectrogram (e.g. PPG-Mel) component of the voice conversion model.

Referring now to FIG. 12, one embodiment of an example PPG-spectrogram (e.g. PPG-Mel) component of the voice conversion model is illustrated. For example, PPG-to-Mel module 1200 (also referred to as a PPG to spectrogram model) is shown having an encoder-decoder network (e.g., PPG encoder 1212 configured to encode the PPG data 1210, lf0 encoder 1222 configured to encode the lf0 or pitch data 1220, energy encoder 1232 configured to encode the energy data 1230, and a decoder 1260 configured to decode the encoded data output by the plurality of encoders) with attention layer 1250. The PPG-to-Mel module 1200 is configured to receive a plurality of data types including PPGs 1210 from a source speaker (e.g., PPG data 143, PPGs 1140), lf0/uv data 1220 (e.g., pitch data/attributes), energy data 1230, as well as a speaker ID 1240 corresponding to the target speaker. Using the speaker ID 1240, the computing system is able to identify a particular target speaker using a speaker look up table (LUT) 1242 which is configured to store a plurality of speaker IDs corresponding to a plurality of target speakers and associated target speaker data (including target speaker Mel spectrum data).

The PPG-to-Mel module 1200 is thus configured to receive as input, the PPGs 1210 extracted from the source speaker data, and one or more prosody features including the pitch data 1220 extracted from the source speaker data and/or the energy data 1230 extracted from the source speaker data. In some embodiments, the PPGs 1210, the pitch data 1220, and energy data 1230 are extracted from the source speaker data based on a frame-based granularity. In some embodiments, the PPGs 1210, the pitch data 1220 and energy data 1230 correspond to the target speaker mel spectrum (e.g., the generated target mel spectrum or the real target speaker's mel-spectrum) and such that the generated (or converted) mel spectrum exactly follows/matches the prosody feature(s) of the source speaker.

Based on the input shown in FIG. 12, the PPG-to-Mel module 1200 is able to generate spectrogram data (e.g., mel spectrograms 1270) that is characterized by the voice timbre of the voice speaker based on data obtained from the Speaker ID 1240 and the speaker LUT 1242. Additionally, the spectrogram data is characterized by the prosody style of the source speaker based on data converted and/or extracted from the source speaker data (e.g., PPGs, pitch contours, and/or energy contours). It should be appreciated that the PPG-to-Mel module 1200 is configured to receive any number of prosody attributes extracted from the source speaker audio data including speaking rate and speaking duration, as well as other rhythmic and acoustic attributes that contribute to the overall prosody style expressed by the source speaker.

In some embodiments, the PPG-to-Mel module 1200 is able to distinguish between prosody attributes (e.g., pitch vs. energy) and select a particular attribute to improve the efficiency and efficacy of the module in generating spectrogram data. In addition, it should be appreciated that the training process and training data generation process is performed differently based on which prosody features or attributes are detected and selected for use in the various processes as described herein.

The more prosody features that are available to be used during the training process and data generation process, the data generated will be more accurate and have a higher quality (e.g., be more closely aligned to the prosody style of the source speaker and sound more like the voice timbre of the target speaker).

In view of the foregoing, it will be appreciated that the disclosed embodiments provide many technical benefits over conventional systems and methods for generating machine learning training data configured to train a machine learning model for generating spectrogram data in cross-speaker style transfer applications, thereby eliminating the need for recording vast amounts of data from a target speaker to capture multiple speaker prosody styles. Furthermore, it provides a system for generating spectrograms and corresponding text-to-speech data in an efficient and fast manner. This is in contrast to conventional systems using only target speaker data where it was difficult to produce large amounts of training data.

In some instances, the disclosed embodiments provide technical benefits over conventional systems and methods for training a machine learning model to perform text-tospeech data generation. For example, by training a TTS model on the spectrogram data generated via methods described herein, the TTS model is able to quickly be trained to produce speech data in the voice timbre of the target speaker and any number of prosody styles of a source speaker. Furthermore, it increases the availability and access to sources of natural language data that previously were not accessible.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., storage 140 of FIG. 1) that store computer-executable instructions (e.g., component 118 of FIG. 1) are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system for generating a spectrogram for a target speaker in a prosody style of a source speaker and for training a machine learning model based on the spectrogram, the method comprising:

receiving electronic content comprising source speaker data from the source speaker;

converting a waveform of the source speaker data to phonetic posterior gram (PPG) data, wherein said converting includes aligning the waveform of the source speaker data to the PPG data, and wherein the PPG data define one or more features corresponding to the prosody style of the source speaker data;

in addition to the one or more features defined by the PPG data, extracting one or more additional prosody features from the source speaker data;

generating a spectrogram based on the PPG data, the extracted one or more additional prosody features and a voice timbre of the target speaker, wherein the spectrogram is characterized by the prosody style of the source speaker and the voice timbre of the target speaker; and generating speech data from arbitrary text using a neural text-to-speech (TTS) model that is trained with the generated spectrogram, the speech data being characterized by the prosody style of the source speaker and the voice timbre of the target speaker.

2. The method of claim 1, wherein the waveform of the source speaker data is aligned to the PPG data at a granularity that is narrower than a phoneme-based granularity.

3. The method of claim 1, wherein the waveform of the source speaker data is aligned to the PPG data at a frame-based granularity.

4. The method of claim 3, wherein the frame-based granularity is based on a plurality of frames, each frame comprising 12.5 milliseconds.

5. The method of claim 1, wherein the one or more additional prosody features extracted from the source speaker data comprise one or more of the following: pitch or energy.

6. The method of claim 5, wherein the one or more additional prosody features extracted from the source speaker data includes said energy, the energy being measured in terms of a volume of the source speaker data.

7. The method of claim 1, wherein the one or more additional prosody features are extracted from the waveform of the source speaker data at a frame-based granularity.

8. The method of claim 1, wherein the method includes the computing system defining the prosody style of the source speaker, the prosody style comprising one of the following: a newscaster style, a story-telling style, a serious style, a casual style, a customer service style, or an emotion-based style, the method including the computing system distinguishing the prosody style from a plurality of possible prosody styles, including the newscaster style, the story-telling style, the serious style, the casual style, the customer service style and the emotion-based style.

9. The method of claim 8, wherein the emotion-based style is detected by the computing system to be at least one of: a happy emotion, a sad emotion, an angry emotion, an excited emotion or an embarrassed emotion, the method including the computing system distinguishing the emotion-based style from a plurality of possible emotion-based styles including the happy emotion, the sad emotion, the angry emotion, the excited emotion or the embarrassed emotion.

10. A method implemented by a computing system for training a voice conversion machine learning model within a voice conversion module to generate a spectrogram for a target speaker with a new prosody style of a source speaker, the method comprising:
training a phonetic posterior gram (PPG) to spectrogram component of the voice conversion machine learning model, wherein the PPG to spectrogram component of the voice conversion machine learning model, during training, is initially trained on multi-speaker data and is configured for converting PPG data into spectrogram data;
refining the PPG to spectrogram component of the voice conversion machine learning model with target speaker data from a target speaker having a particular voice timbre and particular prosody style, by adapting the PPG to spectrogram component to convert PPG data to spectrogram data having the particular prosody style of the target speaker;
receiving electronic content comprising new PPG data converted from a waveform of source speaker data, wherein the new PPG data is aligned to the waveform of the source speaker data;
receiving one or more prosody features extracted from the waveform of the source speaker data; and
applying the source speaker data to the voice conversion machine learning model, wherein the refined PPG to spectrogram component of the voice conversion machine learning model is configured to generate a spectrogram in the particular voice timbre of the target speaker, but having the new prosody style of the source speaker rather than the particular prosody style of the target speaker.

11. The method of claim 10, wherein the new PPG data is aligned to the waveform of the source speaker data at a granularity that is narrower than a phoneme-based granularity.

12. The method of claim 10, wherein the new PPG data is aligned to the waveform of the source speaker data at a frame-based granularity.

13. The method of claim 12, wherein the frame-based granularity is based on a plurality of frame, each frame comprising approximately 12.5 milliseconds.

14. The method of claim 10, wherein the one or more prosody features extracted from the waveform of the source speaker data comprise at least one of: a pitch contour, an energy contour, a speaking duration or a speaking rate.

15. The method of claim 14, wherein the refined PPG to spectrogram component of the voice conversion machine learning model is configured to generate a spectrogram in the particular voice timbre of the target speaker, but having the new prosody style of the source speaker rather than the particular prosody style of the target speaker based on at least one of: the pitch contour, energy contour, speaking duration or speaking rate extracted from the source speaker data.

16. The method of claim 14, wherein the pitch contour and/or the energy contour are extracted from the waveform of the source speaker data at a frame-based granularity.

17. A method implemented by a computing system for generating training data for training a neural text-to-speech (TTS) model configured to generate speech data from arbitrary text, the method comprising:
receiving electronic content comprising source speaker data from a source speaker;
converting a waveform of the source speaker data to phonetic posterior gram (PPG) data, wherein said converting includes aligning the waveform to the PPG data;
extracting one or more prosody features from the source speaker data;
applying at least the PPG data and the one or more extracted prosody features to a pre-trained PPG to spectrogram component of a voice conversion module, the pre-trained PPG to spectrogram component configured to generate a spectrogram in a particular voice timbre of a target speaker, but having a new prosody style of the source speaker rather than a particular prosody style of the target speaker;
generating training data configured to train a neural US model, the training data comprising a plurality of spectrograms characterized by the particular voice timbre of the target speaker and the new prosody style of the source speaker; and
generating speech data from arbitrary text using the neural US model, which is trained on the generated training data, generating the speech data from the arbitrary text is performed using cross-speaker style transfer, and the speech data is characterized by the prosody style of the source speaker and the voice timbre of the target speaker.

18. The method of claim 17, further comprising:
receiving electronic content comprising arbitrary text;
applying the arbitrary text as input to the trained neural TTS model; and generating output comprising speech data based on the arbitrary text, wherein the speech data is characterized by the prosody style of the source speaker and the voice timbre of the target speaker.

19. The method of claim 17, wherein the waveform is aligned to the PPG data at a granularity that is narrower than a phoneme-based granularity.

20. The method of claim 17, wherein the waveform is aligned to the PPG data at a frame-based granularity.

\* \* \* \* \*